United States Patent

Williams, Jr.

[11] 3,964,203
[45] June 22, 1976

[54] FISHING LURE

[76] Inventor: William O. Williams, Jr., 1309 Lynhurst Drive, Gastonia, N.C. 28052

[22] Filed: Jan. 27, 1975

[21] Appl. No.: 544,036

[52] U.S. Cl............................ 43/42.02; 43/42.06; 43/42.29
[51] Int. Cl.²........................................ A01K 85/00
[58] Field of Search............. 43/42.02, 42.06, 42.29

[56] References Cited
UNITED STATES PATENTS

| | | | |
|---|---|---|---|
| 1,939,291 | 12/1933 | Buddle | 43/42.29 X |
| 2,423,717 | 7/1947 | Mikina | 43/42.06 |
| 2,519,338 | 8/1950 | Arnold | 43/42.29 |
| 2,826,853 | 3/1958 | Guy et al. | 43/42.06 |
| 3,047,975 | 8/1962 | Pretorius | 43/42.06 |
| 3,100,360 | 8/1963 | Creme | 43/42.02 |

*Primary Examiner*—Louis G. Mancene
*Assistant Examiner*—Daniel J. Leach
*Attorney, Agent, or Firm*—Richards, Shefte & Pinckney

[57] ABSTRACT

A fishing lure formed of a strip of flat chamois that provides appearance and flexibility for fish attracting action, and which is impregnated with animal blood particles that exude slowly from the chamois during use in water to combine with the appearance and action of the chamois for enhanced fish attraction. The strip of chamois has a flat spiral-like configuration that allows fish attracting movement of the strip during use from flat disposition to a helical-like configuration, and is attached to a fish hook through a hole formed adjacent one end of the strip, with another hole spaced longitudinally from the first hole to allow folding of the strip to a shorter length at which the holes are superimposed for hook disposition in both holes. Preferably the chamois is of the type that has been treated with cod fish oil, and it is treated with a solution of sodium bicarbonate and grain flour for improved cutting texture and blood particle absorption.

9 Claims, 6 Drawing Figures

FISHING LURE

BACKGROUND OF THE INVENTION

The present invention relates to fishing lures and more particularly to fishing lures made of flexible material shaped to provide a fish attracting action and that dispenses a fish attracting scent.

One of the oldest and most widely used fishing lures is the common earthworm, particularly the bloodworm variety, which is sufficiently flexible to provide some fish attracting action and also gives off its blood-like substance that further attracts fish. However, worms are not always readily available and when bought can be expensive. Further, they are relatively fragile and lose their blood-like substance rather rapidly so that they have a relatively short usefulness.

As substitutes for natural earthworms, lures are made in many forms from plastic material, preferably from soft flexible material that provides a fish attracting action, feel and appearance. However, to obtain desired flexibility these lures must be relatively thin, which renders them susceptible to tearing with a resulting short use life and they are not easily adapted to give off any fish attracting substance or scent.

Other forms of lures presently used are pork rind, feathers, plastic or rubber skirts, hair, or marabou. However, none of these has the capability of absorbing and releasing any fish attracting substance or scent.

In contrast, the present invention provides an inexpensive, long lasting fishing lure that has enhanced fish attracting taste, shape, feel, appearance, flexibility, and action, and importantly is capable of absorbing and slowly exuding a water soluble fish attracting substance that is dispersed by the lure to produce a scent that enhances the overall fish attracting capabilities of the lure.

SUMMARY OF THE INVENTION

Briefly described, the fishing lure of the present invention includes a strip of material having toughness, flexibility, and blood particle absorption and exudation characteristics similar to chamois. This strip of material is impregnated with a water soluble fish attracting substance such as animal blood that exudes slowly from the strip of material when the lure is in water to combine with the appearance and action of the material for enhanced fish attraction.

Preferably, the strip material is flat chamois and the water soluble fish attracting substance is animal blood particles. For particular appearance and flexibility characteristics the chamois is of the type that has been treated with cod fish oil, and it is further treated with a solution of sodium bicarbonate and grain flour that is absorbed in the chamios to facilitate cutting of the chamois into strips and to facilitate dispersion of the animal blood particles in the chamois.

Chamois has a further advantage of swelling when wet to several times its dry thickness for enhanced fish attractiveness.

The strip of material has an attachment hole adjacent one end for attachment to a fish hook and preferably has another attachment hole spaced from the first hole longitudinally of the strip to allow hook disposition in both holes after folding of the chamois strip to superimpose the holes and thereby modify the extent of the strip from the hook as well as strengthen the hook attachment. A plurality of holes can also serve to attach a greater or lesser length on the hook or for attachment to more than one hook.

In the preferred embodiment the chamois strip has a curved flat tail portion that curves back toward the hook end thereof and is formed by shaping the strip in a spiral-like configuration that allows movement of the strip during use in water from a flat disposition to a helical-like configuration in a fish attracting action.

DETAILED DESCRIPTION OF THE PREFERRED EMBODIMENTS

Figure 1:
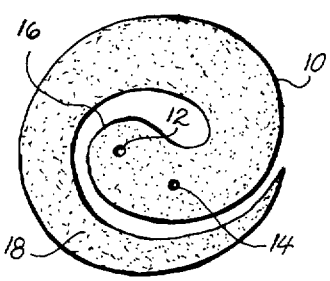
FIG. 1 is a plan view of one embodiment of the fishing lure of the present invention showing it in its original flat spiral-like configuration.

Referring to the embodiment of the fishing lure of the present invention illustrated in FIGS. 1–4, the lure is seen to be a flat strip 10 of material formed in a spiral configuration. In the disclosed embodiment the material is a tough, flexible material having toughness, flexibility, and blood absorption and exudation characteristics similar to chamois, and for best results is chamois itself although other similarly characterized material could be used.

The flexibility of chamois allows it to move rapidly in a fish attracting action when in the spiral configuration illustrated. The toughness of chamois allows it to be used repeatedly and not to be torn apart by fish strikes and obstructions. The blood absorption and exudation characteristics allows it to absorb blood particles prior to use and then to slowly exude the blood particles during use to attract fish, as described further hereinbelow. Chamois is also capable of swelling when wet to several times its thickness when dry without losing its action, thus enhancing its fish attractiveness.

Any commercially available form of chamois is suitable, but preferably it is of the type that has been treated with cod fish oil during its normal processing, which seems to enhance its physical characteristics and probably its scent as a fish attracting object.

Combined with the chamois-like material to provide the uniquely effective fishing lure of the present invention is a water soluble fish attracting substance such as animal blood, with which the strip 10 is impregnated and which exudes slowly from the strip when the lure is in use in water, with the substance providing a scent that is dispersed by the action of the lure to attract fish thereto. Preferably the substance is actual animal blood that is commercially available in dried particle form from meat processing plants and then put in solution with water for impregnating the chamois material. The use of chamois or chamois-like material is particularly significant because it will soak up a substantial amount of animal blood particles and release them slowly so that the lure can be used for a considerable length of time before the animal blood particles have been fully exuded and dispersed. Further, a used chamois lure can be again impregnated with animal blood for reuse.

The animal blood may be bloodmeal sold by Swift & Co. Feed Mill of Evansville, Indiana, or it may be a bovine hemoglobin enzyme substrate powder sold by Miles Laboratories of Kankakee, Illinois, or other animal blood substance that is water soluble for chamois impregnation and exudation and dispersion from chamois in water.

The treatment of chamois to produce the lure of the present invention according to the preferred embodiment begins with about 20 sheets of chamois about 7 by 9 inches. An animal blood solution is then prepared by dissolving or dispersing 6 ounces of one of the aforementioned animal blood substances in one gallon of water with coloring added as desired. Next, ⅛ ounce of bicarbonate of soda and ⅛ ounce of grain flour is boiled in ¼ cup of water to a paste that is added to the animal blood solution. The 20 chamois sheets are then placed in the prepared solution and allowed to soak for up to ½ hour or longer. The chamois are then stacked on top of each other and allowed to drain, with the stacking resulting in a slow draining that assure maximum impregnation and retention of the animal blood particles in the chamois. The chamois are then individually hung on a rack to dry for as much as 3 days or more indoors, or for from 6-8 hours to 1 day outdoors. Finally, the chamois sheets are cut by stamping into the illustrated spiral-like lure configuration 10, and hook attaching holes 12 and 14 are punched adjacent the spirally inner end 16 for attachment of the lure 10 on hook H. When so treated, these chamois lures can sustain many hours of use without losing completely their scent exuding effectiveness.

The aforementioned inclusion of bicarbonate of soda and grain flour provides body to the chamois to allow clean cutting and stamping of the individual spiral-like lures from the chamois sheets without shredding and also may facilitate impregnation of the animal blood solution into the chamois.

Although it is preferable to soak the entire chamois sheets in the animal blood solution for best impregnation, the solution may be applied, as by sponge, to only one side of the sheets and a differently colored solution or other treatment applied to the other side for differently colored or textured opposite sides. Moreover, when the animal blood solution has been spent, it can readily be replaced by soaking again or conveniently and inexpensively simply by rubbing dry blood meal on or into a wet piece of chamois at the point of fishing without needing to make up a wet mixture.

Figure 2:
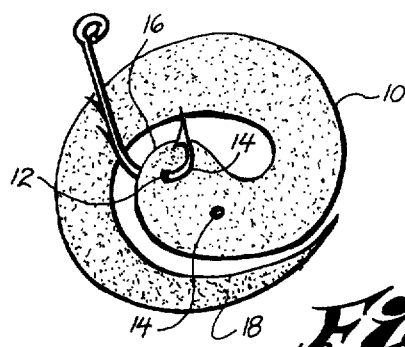
FIG. 2 is a view similar to FIG. 1 with the lure shown attached to a fish hook.
Figure 3:
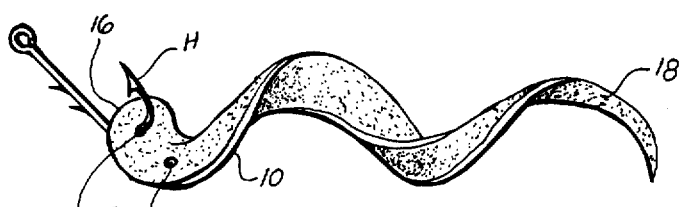
FIG. 3 is a plan view of the fishing lure of the preceding figures showing it pulled to a full helical extent as occurs in use.

In the form illustrated in FIGS. 1-4 the spiral-like configuration of the strip 10 includes the inner hook-attaching end 16 and an outwardly spiraling narrow, thin tail portion 18 that extends for more than one complete spiral revolution and in which the tail portion 18 curves back toward the inner end 16 (FIGS. 1 and 2). As the strips 10 are stamped from flat sheets the spiral configuration is initially flat but due to the thinness and flexibility of the chamois the spiral configuration is distended from a flat disposition to a helical-like configuration (FIG. 3) with the strip flexing and moving under the influence of water currents and hook movement to produce a rapid fish attracting action (compare FIGS. 3 and 4).

Figure 4:
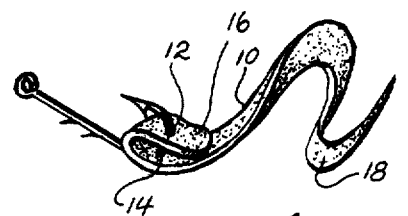
FIG. 4 is a view similar to FIG. 3 showing the lure folded at its end attached to the fish hook and showing it in a less than full helical extent.

Attachment of a fish hook H is accomplished by inserting the hook through the hole 12 adjacent the inner end 16 of the strip 10. The second hole 14 serves as another hook attachment hole and is spaced longitudinally of the strip 10 from the first hole 12 away from the inner end 16 of the strip. This second hole 14 allows the inner end of the lure to be folded so that after folding to superimpose the holes 12 and 14 the hook H can be inserted through both holes, thereby strengthening the attachment and shortening the effective length of the lure, if such is desired (FIG. 4). The attachment holes 12 and 14, with or without further holes, may serve as a plurality of longitudinally spaced holes to attach a lesser or greater length of material on a hook with or without folding or to allow attachment to more than one hook.

Figure 5:
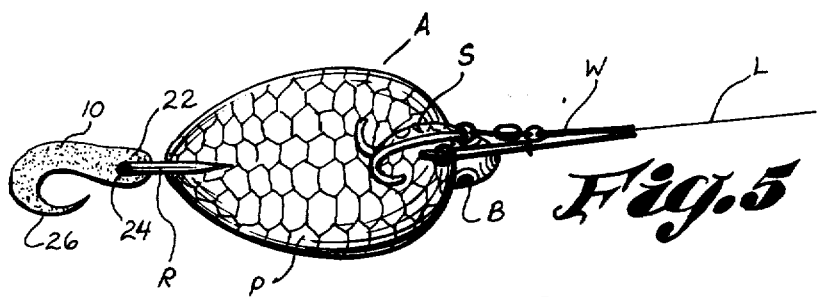
FIG. 5 is a plan view of an artificial fishing lure that incorporates an alternate form of the present invention.
Figure 6:
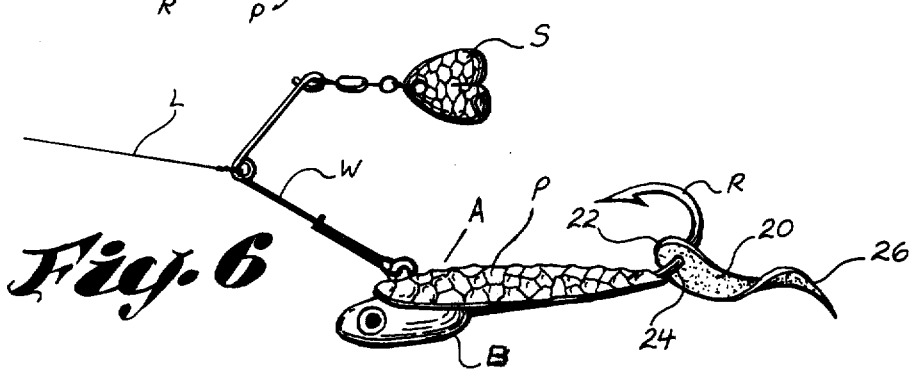
FIG. 6 is a side elevation of the subject matter of FIG. 5 showing an extended configuration.

Referring to the embodiment of FIGS. 5 and 6, a lure is shown formed of a strip 20 of the same material as the strip described in reference to FIGS. 1-4 and similarly processed and impregnated with water soluble animal blood particles or a similar substance. This strip 20 differs only in size and the degree of its spiral-like configuration, and is shown used as a tail on another type of fishing lure. This form of strip 20 also has an inner hook attaching end 22 with only a single hook receiving hole 24 and it has a flat tail portion 26 that is comparatively short, curving back toward the inner end 22 in less than a complete spiral revolution but capable of movement from a flat disposition to a somewhat spiral-like configuration in a fast action during use in water. The strip 20 is attached to the rear hook R of an artificial lure A that has a body B to which is attached a curved plate P and a spinner S supported above the plate P on a connecting wire W to which the line L is attached. The lure A, without the strip 20, is the subject of my copending U.S. patent application, Ser. No. 491,859, filed July 25, 1974, and the strip 20 of the present invention adds further fish attracting action and scent characteristics thereto.

The lure of the present invention could also be used in combination with various other types of lures as an additional tail or otherwise to enhance the fish attracting quality of the overall lure.

From the foregoing detailed description it is apparent that the present invention provides a lure that is thin, flexible and spirally shaped to provide rapid action; that is tough and, therefore, long lasting and inexpensive to use; that maintains its flexibility without hardening when allowed to dry; that has a natural bait appearance, taste, smell, feel and action; that exudes a fish-attracting scent over a relatively long period of time with dispersion of the scent being enhanced by the rapid action; that is inexpensive to produce; and that is an advantageous substitute for an earthworm and an improved replacement for other types of lures that attempt to imitate natural bait.

It is to be understood that the foregoing detailed disclosure has been provided for the purpose of illustration only and that the present invention is not limited thereto but could be varied therefrom within the scope of protection that is intended to be limited solely by the appended claims.

I claim:

1. A fishing lure comprising a strip of material having toughness, flexibility, and blood particle absorption and exudation characteristics similar to chamois, said material being impregnated with a water soluble fish attracting substance such as animal blood that exudes slowly from said material during use of the lure in water to combine with the appearance and action of said strip of material for enhanced fish attraction, and said strip having a curved flat tail portion that is capable of movement during use in water from a flat disposition to a contoured disposition for enhanced exudation of the impregnated substance under the action of the water thereagainst in a fish attracting action.

2. A fishing lure according to claim 1 and characterized further in that said strip of material is chamois that has been treated with cod fish oil.

3. A fishing lure according to claim 1 and characterized further in that said strip of material is chamois and said substance is animal blood particles.

4. A fishing lure according to claim 3 and characterized further in that said chamois has been treated with cod fish oil.

5. A fishing lure according to claim 3 and characterized further in that said chamois has absorbed therein sodium bicarbonate and grain flour.

6. A fishing lure according to claim 1 and characterized further in that said strip of material is flat chamois having an attachment hole adjacent one end of said strip for attachment to a fish hook from which the strip extends for fish attracting action when used in water and has another attachment hole spaced from said first mentioned hole longitudinally of said strip to allow hook disposition in both holes after folding of said chamois to superimpose the holes and thereby modfy the extent of said chamois strip from the hook.

7. A fishing lure according to claim 6 and characterized further by a plurality of hook attachment holes spaced longitudinally in said piece of material.

8. A fishing lure according to claim 3 and characterized further in that said flat chamois strip has a spiral-like configuration that allows movement of the strip during use in water from a flat disposition to a helical-like configuration in a fish attracting action.

9. A fishing lure according to claim 8 and characterized further in that said strip extends in said spiral-like configuration for more than one spiral revolution.

* * * * *